April 30, 1963 H. WALTER 3,087,304
METHOD AND DEVICE FOR PROPELLING SUBMARINE VEHICLES
Filed Dec. 21, 1959

INVENTOR:
HELLMUTH WALTER
ATTORNEYS

April 30, 1963     H. WALTER     3,087,304
METHOD AND DEVICE FOR PROPELLING SUBMARINE VEHICLES
Filed Dec. 21, 1959     5 Sheets-Sheet 3

INVENTOR:

HELLMUTH WALTER

ATTORNEY:

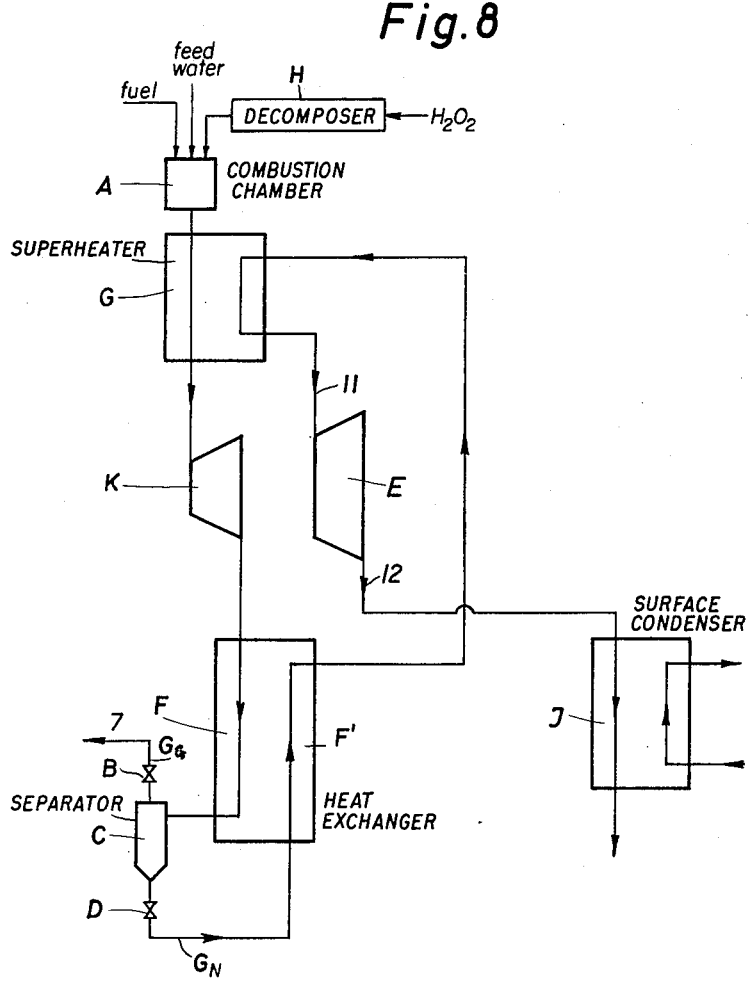

United States Patent Office
3,087,304
Patented Apr. 30, 1963

3,087,304
METHOD AND DEVICE FOR PROPELLING SUBMARINE VEHICLES
Hellmuth Walter, 181 Fernwood Ave.,
Upper Montclair, N.J.
Filed Dec. 21, 1959, Ser. No. 860,922
Claims priority, application Germany Dec. 22, 1958
9 Claims. (Cl. 60—39)

This invention in general relates to a method and a device for propelling submarine vehicles, and in particular to submarine boats and torpedos.

For the propulsion of submarine vehicles it has already been proposed to decompose $H_2O_2$ (hydrogen peroxide), to combust the liberated oxygen with a carbon hydrogen, to cool the thus formed mixture of water vapors and gas by injecting feed water, and to use the mixture thus enriched with water vapor for generating mechanical energy. The decomposition of the $H_2O_2$ was achieved by means of a catalyst, e.g. natrium permanganate, calcium permanganate, silver wire or platinum sponge. After the $H_2O_2$ solution has been decomposed within a decomposer with the aid of the catalyst into water vapor and $O_2$-gas, a fuel, for example a carbon hydrogen, is added to this mixture of water vapor and gas within a combustion chamber, whereupon the feed water is injected serving to cool the then forming water vapor-gas mixture (and to enrich this mixture with water vapor).

In this way, a water vapor-gas mixture having a temperature of 600° C., for example, which may be utilized in a power engine, i.e., a turbine, is obtained within the combustion chamber. This method is known and is denominated as one of the "hot Walter-methods." The disadvantages of these methods is that the turbine is not protected against burning-out if a failure of feed water should occur. Besides this, it is difficult to obtain a low pressure behind the turbine, as the gaseous combustion products must be compressed again to the pressure of the environment, i.e. to the water pressure which is dependent on the diving depth.

Also, a so called indirect "Walter-method" is known and has been tested, in which decomposed $H_2O_2$ and a carbon hydrogen serving as fuel are pressed into the combustion chamber. Feed water is then evaporated and overheated in a surface heat exchanger. The thus formed steam is utilized to drive a normal steam turbine. However, the combustion chamber and the heat exchanger of this indirect method are thermically stressed very highly, and the operating safety must therefore be objected to.

The main object of this invention is to provide a method to overcome these drawbacks.

The method according to the invention starts out from the known method in which fed water is injected into a combustion chamber for cooling the watervapor-gas mixture, and for enriching this mixture with steam.

The invention preferably makes use of those methods, in which a special catalyst is used to decompose the $H_2O_2$. However, the invention also relates to those methods, in which the fuel will react with $H_2O_2$ without a special catalyst. Hydrazine-hydrate which is self-ignitnig and with which other fuels, e.g. alcohols, may be mixed has been found especially suitable. But the combustion may also take place directly after a catalytic or thermical ignition without any further effects or additives.

The hydrazine-hydrate, however, is afflicted with the drawback that the final gas $N_2$ can not be practically absorbed by water which is of essential disadvantage for some submarine vehicles.

One object of the invention is to provide a method in which the heat of the mixture is removed in a counter current exchange to a maximum of condensation of its steam contents, before the mixture is utilized to generate mechanical energy which thereupon the condensate, after separation of the gas contents, serves as a heat absorbing medium during the heat exchange.

In this manner the combustion chamber as well as the turbine are protected. There are less rotating elements than in the direct method, and the heat exchanger for carrying out this method may be of known construction and is subjected to less heat stresses, so that a maximal operating safety is obtained. The turbine arranged behind the heat exchanger exclusively uses steam thus making it possible to obtain a greater under-pressure than is possible in using the indirect method, as the gas content practically amounts to nought.

Another object of the invention is to provide an improved method, in which additional heat for preheating the feed water is withdrawn from the primary gas mixture after heat has been removed by the heat exchanger.

The gas-steam mixture is formed within the combustion chamber in the known manner. Directly downstream of the combustion chamber this mixture enters the heat exchanger and transfers a great amount of its heat, thereby condensating the greater part of the steam. A part of the still remaining heat is used for preheating the feed water in a feed water surface-preheater. The condensate is fed to a separator, where the $CO_2$ together with a small amount of water and steam escapes outboards. The condensate is recirculated via a reducing valve through the heat exchanger and absorbs the heat which it has emitted before. Thus, the condensate is evaporated and super-heated up to 600° C. In this it is assumed that a mixture temperature of 700° C. has been generated in the combustion chamber.

The pure steam discharged from the heat exchanger and having a temperature of 600° C. actuates a condensing turbine and is then condensated in a condenser. Part of the condensate is recirculated into the process as feed water, while the rest is also pressed outboards by means of a pump or an ejector. This must take place with a very small amount of $CO_2$, which is dissolved in the condensate within the condensate container exposed to high pressure. The $CO_2$ is only liberated upon relief within the condenser.

Another object of the invention is to provide a device for carrying out the method according to the invention in which throttle means are provided so that the steam pressure between a gas separator and the entrance into the heat absorbing duct of a heat exchanger is smaller than the partial steam pressure at the exit of the heat emitting duct of the heat exchanger.

Still another object of the invention is to provide a high pressure gas-stream power engine, preferably a high pressure gas-steam turbine, being arranged before the heat exchanger, and a second low pressure steam engine utilizing the steam generated within the heat exchanger.

Still another object of the invention is to provide a superheater for intersuperheating the steam discharged from the heat exchanger before entering the low pressure steam engine, the steam-gas mixture being used as heat emitting medium before it enters the high pressure steam engine.

The heat exchanger represents besides its normal function a protection of the turbine against the hot combustion gases in case a failure of injecting feed water into the combustion chamber should occur for some reason. Furthermore the turbine blades are protected against erosion by the abrasive action of catalyst. Against this effect the heat exchanger is not as sensitive. The otherwise required dust separator behind the combustion chamber may be combined with the heat exchanger.

The most important and at the same time characteristic element of the drive according to the invention is the surface heat exchanger, which in this case has the function of a condenser-evaporator. It serves to separate the $CO_2$-steam mixture coming from the combustion chamber by condensation. The heat obtained from the mixture is used for evaporating the condensate.

Further improvements and features of the invention are described below in connection with the figures in which several embodiments of the invention are shown diagrammatically. It is to be understood, however, that the invention is by no means restricted to the illustrated embodiments, as changes are possible without departing from the scope of the invention.

In the drawings:

FIG. 8 is a diagram of still another embodiment according to the invention, in which two turbines are provided.

For simplicity's sake it is assumed that the pressure loss of the heat exchanger is nil.

*Layout Without Preheater (FIGS. 1 and 2)*

The highly concentrated $H_2O_2$ (e.g. 80%) is decomposed in a known manner within a decomposer H into $H_2O$-vapor and $O_2$-gas using a catalyst. The mixture is fed to a combustion chamber A shown in FIG. 1 into which fuel, preferably a carbon hydrogen, and feed water are injected. By the combustion of the fuel and by evaporation of the injected feed water, a mixture composed of combustion gases and superheated steam is formed. In combusting a carbon hydrogen, an amount by weight $G_H$ of the superheated $CO_2$-steam mixture leaves the combustion chamber A and enters the heat exchanger F at point 1. Initially the mixture transmits its superheating heat, and in this it follows the law of gases until it reaches the dew-point in point 2 of the high pressure side. Upon further heat absorption, the condensate precipitates. Thereby the volume ratio of $CO_2$ to steam, which has been constant up to the point 2 changes. This means that the $CO_2$-volume percentages are constantly increasing from point 2 to point 3 as the amount of condensate increases. As on the other hand, the volume ratio determines the partial pressures, each mixture of $CO_2$-steam condensate can only have one temperature, i.e. the boiling temperature corresponding to the partial pressure of the steam. Therefore it is possible to draw an enthalpy-temperature curve for the mixture on the high pressure side, and associate to each temperature the composure of the mixture (see FIG. 3).

Figure 1:
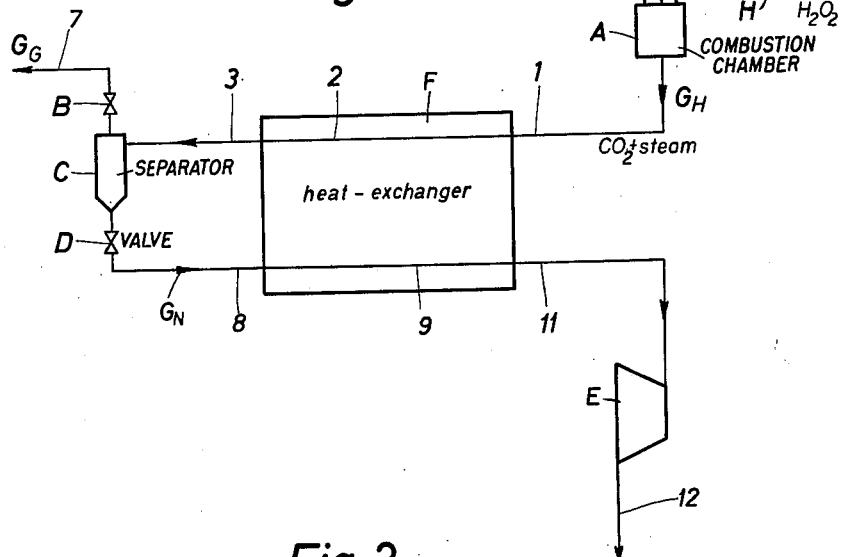
FIG. 1 is a diagram of a simplified embodiment according to the invention.
Figure 2:
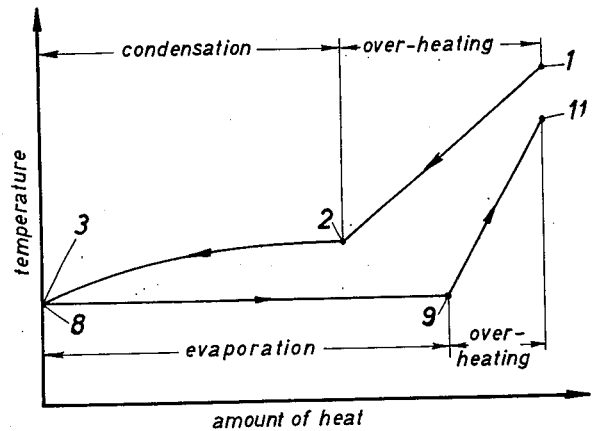
FIG. 2 is a heat diagram illustrating the functioning of the drive shown in FIG. 1.

From point 3 in FIG. 1 the mixture is supplied to the separator C, where it is separated. The gas component, $G_G$, consisting of $CO_2$ and a small amount of steam, is removed from the process by means of the valve B and is pressed outboards, while the entire condensate $G_N$ flows to the low pressure side of the heat exchanger via the throttle valve D. If here the water is to evaporate a temperature difference must prevail between the points 3 and 8. This demand is fulfilled if the pressure in point 8 is smaller than the partial pressure of the steam in point 3.

Therefore the following condition prevails $$P_5 \leq (P_{H_2O})_3 \quad (1)$$

It must be fulfilled if the heat exchanger is to work as a "condenser-evaporator." Furthermore, it may be derived from the Equation 1 that the ratio of pressure between the high pressure and low pressure side has an essential influence on the total efficiency of the process.

The condensate $G_N$ flows from point 8 in a counter current direction through the heat exchanger and is evaporated when reaching the point 9. Thereafter the steam is superheated and from superheater point 11 enters the turbine E. The balance of heat between the high pressure and the low pressure side may be formulated as follows:

$$G_H(i_1 - i_3) = G_N(i_{11} - i_8) \quad (2)$$

where $i_1$, $i_3$, $i_5$ and $i_7$ are the enthalpies at the respective points. It should be noticed, however, that $i_3$ is always unequal to $i_8$. With the aid of this relation it is possible to estimate the limits of the process. The following equation expresses the effective work of the turbine expressed in a measurement of heat $$Q_E = G_N(i_{11} - i_{12}) \cdot \eta \quad (3)$$

where $i_8$ is the enthalpy at point 8 and $\eta$ is turbine efficiency. Now it is possible to consider the following limiting cases which are illustrated in FIGS. 4 and 5 ($i_{11}$ and $\eta$ are assumed to be constant):

(A)

Figure 4:
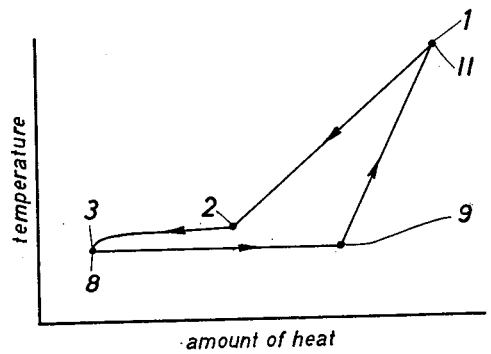
FIG. 4 is a heat diagram to explain the functioning of the drive according to FIG. 1 in which the demand of a maximal enthalpy before the turbine is fulfilled.
Figure 5:
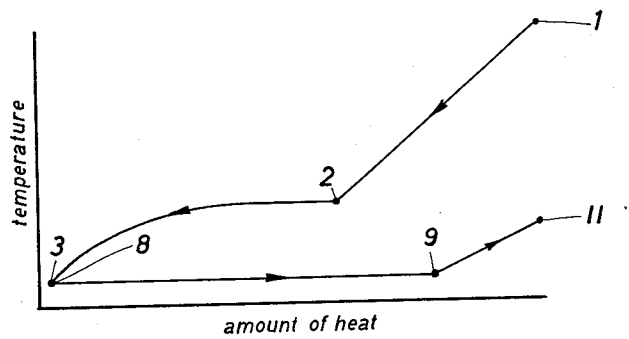
FIG. 5 is a heat diagram explaining the functioning of the drive according to FIG. 1 in which the demand of a maximal weight flow within the low pressure system is fulfilled.

*Demand.*—Maximal enthalpy in point 11, and therewith maximal difference of enthalpy, FIG. 4.

*Result.*—The temperatures $t_1$ and $t_{11}$ become equal, the ratio of weight $G_N:G_H$ becomes a minimum, the ratio of pressure $P_N:P_H$ reaches its maximal value.

*Process.*—The total efficiency of the method is bad, as the loss of heat attains its maximum value with the weight of gas removed via the valve B.

$$Q_7 = (G_H - G_N) \cdot i_7 \quad (4)$$

(B)

*Demand.*—Maximal weight of steam $G_N$ in point 11, FIG. 5.

*Result.*—The enthalpy in point 11 and the ratio of pressures $P_N:P_H$ attain the minimum.

*Process.*—Though the loss $Q_7$ is small, the resulting power at the turbine shaft is small, as great volumes of steam with a low heat capacity and pressures are of little value only.

It is evident from the above description that the ratio of pressures $P_N:P_H$ between the low pressure and the high pressure circuit represents the characterizing value of the method. Besides the theoretical considerations, purely practical points of view are involved in the choice of the quotient $P_N:P_H$ which demands, that the weight and the required space of the heat exchanger group should be as small as possible at admissible losses of pressure. From this it may be followed for the process, that;

(1) the temperature difference between both sides must be great, i.e. only then, when the partial pressure of the steam in point 3 is essentially higher than the pressure in point 8, the heat exchanging surface becomes small, and the apparatus light of weight, (2) the two pressures $P_N$ and $P_H$ must be as high as possible, in order to have small steam volumes and thus small cross sectional areas within the apparatus. At small steam volumes, small pipe diameters may be chosen which will give great surface densities.

Summing up, the principal points are as follows:

If a gas-steam mixture is to be separated by condensation, and the condensate is to be evaporated on the other side of the heat exchanger the gas-steam side must have a higher pressure than the pure water-steam side. The ratio of pressure between both sides is essential for the efficiency of the process and the weight of the apparatus. The volume of the heat exchanger is substantially determined by the absolute value of the two pressures.

Figure 6:
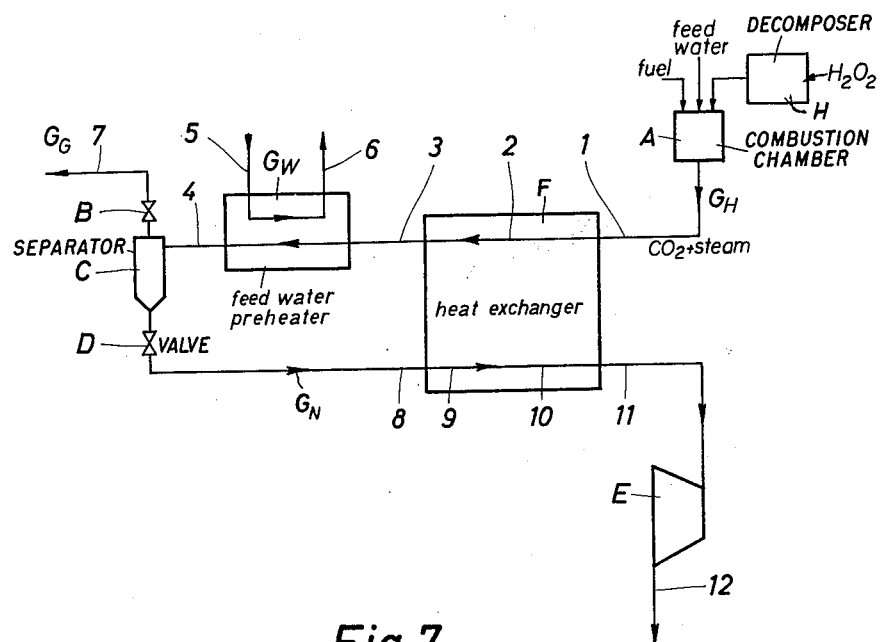
FIG. 6 is a diagram of another embodiment according to the invention in which besides a heat exchanger a feed water surface preheater is provided.
Figure 7:
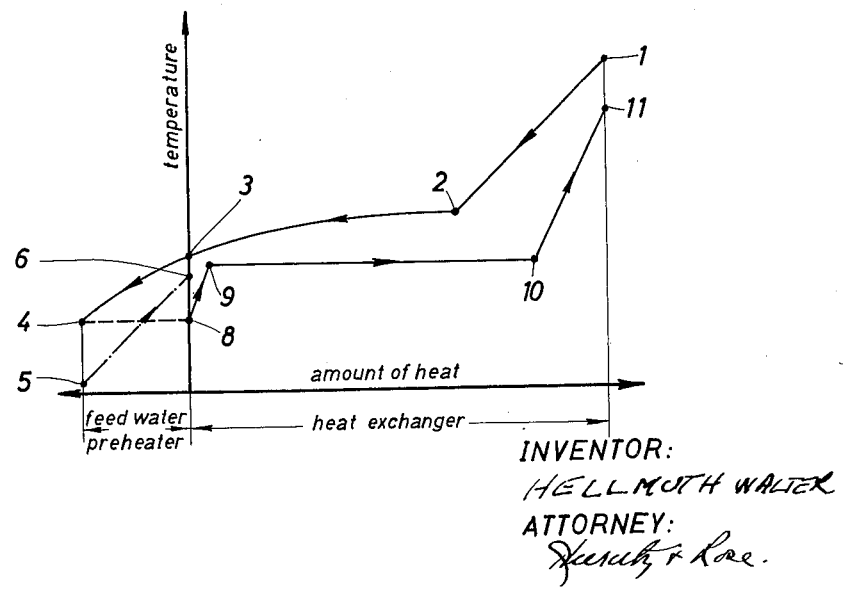
FIG. 7 is a diagram explaining the functioning of drive according to FIG. 6.

Arrangement with preheater (FIGS. 6 and 7).

Figure 3:
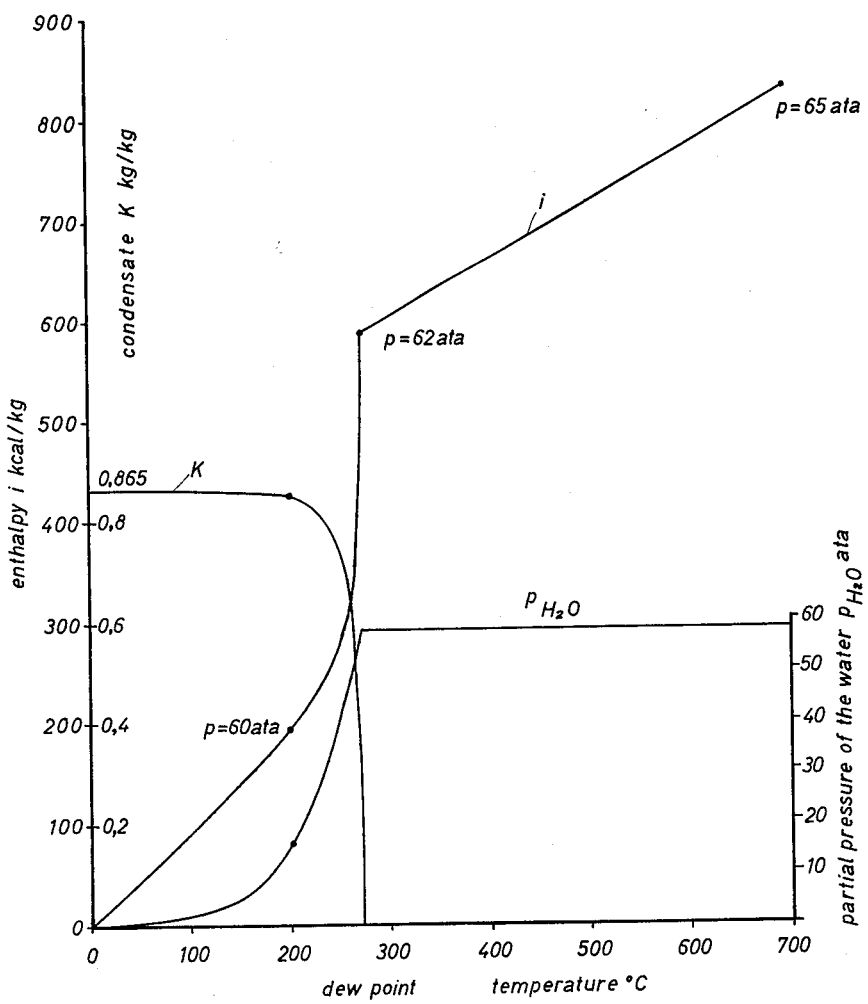
FIG. 3 is an enthalpy-temperature diagram to explain the functioning of the drive according to FIG. 1.

This system differs from the process shown in FIGS. 1 and 3 in that a feed water preheater which is independent of the low pressure side has additionally been installed within the high pressure part. The $CO_2$-steam mixture flows as before out of the combustion chamber A via point 1 to the heat exchanger F, attains in point 2 the dew point line, and leaves the apparatus in point 3 with a great amount of condensate. On the way to the separator C the mixture must pass the feed water preheater whereby it is cooled additionally, and whereby additional condensate is obtained until it reaches point 4. Within the separator the separation of gas and liquid takes place. The gas component and the surplus of condensate are removed from the circuit, while the main part of the water flows to the low pressure side via the valve D. There it is preheated to boiling temperature from point 8 to 9, evaporated up to point 10, and leaves the apparatus superheated at point 11.

By including the feed water preheater one obtains:

(1) A better efficiency of the process, as the $CO_2$-steam mixture may now be cooled below the boiling temperature of the low pressure circuit, (2) A great difference of temperature for the heat exchange and therefore small apparatuses, and (3) A greater flow of weight with reference to the fuels, and therefore a greater ratio of $H_2O:CO_2$ which is of advantage for the efficiency as well as the heat exchange.

Arrangement with two turbines (FIG. 8).

In another arrangement, shown in FIG. 8, two turbines are provided. Though this arrangement is more complicated it may be of advantage, if the weight and space limitation is abolished, as this arrangement provides a better total efficiency.

The mixture generated in the combustion chamber A is fed through a superheater G, and is expanded in the high pressure turbine K. Thereupon it is supplied into the already described heat exchanger F and is separated in the separator C. The gas component is again removed from the process and the condensate is led to the low pressure side via a throttle valve D, where it evaporates in counter current direction. The steam flows from the counter flow F' in heat exchanger F to the superheater G and then enters the low pressure turbine E. J denominates a surface condenser which is cooled by sea water in a known manner.

The characteristics for this circuit are:

(a) the distribution of the pressure relation onto two turbines and the intermediate superheating, (b) the utilization of the $CO_2$-heat contents in the high pressure turbine, but therefore (c) the heat exchanger must be arranged in the low pressure zone.

In the practical realization of this system the difficulties are encountered in the construction of the heat exchangers. As known the coefficient of heat transmission only increases with the 0.6th to 0.8th power of the product of speed and specific weight, while the loss of pressure increases with the second power of the speed and linearly to the specific weight. Due to this the heat exchanger arranged in the low pressure zone must operate with very small heat transmission coefficients, if the pressure loss in the apparatus chosen in the system 2 is not to exceed 8 to 15% of the absolute pressures.

*Résumé*

The total efficiency of the arrangement which is only slightly better is only obtainable with an extremely large and heavy heat exchanger.

*The Choice of the Process*

The first one of the three described processes has the poorest thermical efficiency. Furthermore, it is annoying that both circuits are thermically tightly coupled.

This is not the case in the second process. In this case the pressure relation may be influenced by choice of further cooling the HD-mixture in the feed water preheater and also the ratio of weight may be influenced within certain limits. Due to this a better efficiency is obtained. The better efficiency of the third process will only be advantageous in exceptional cases on account of the increased constructional costs and the expenditure of weight.

What is claimed is:

1. A method for generating superheated steam comprising the steps of supplying a source of $H_2O_2$, decomposing said $H_2O_2$ to liberate oxygen, burning said liberated oxygen with a carbon hydrogen and feed water to produce a steam-gas mixture having sufficient steam content to be utilized for generating mechanical energy, removing sufficient heat from said first mixture with a separated steam condensate in a counter current heat exchanger to produce maximum steam condensation content in said steam-gas mixture, separating the steam condensation from the gas emanating from the heat exchanger to form the separated steam condensate and evaporating and superheating the feed water with said steam-gas mixture in said heat exchanger.

2. The method of claim 1 further comprising the step of heating the separated steam condensate with the mixture emanating from the heat exchanger.

3. Apparatus for generating superheated steam comprising means for decomposing $H_2O_2$ to liberate oxygen, means for burning the oxygen liberated from the decomposed $H_2O_2$ with a carbon hydrogen and feed water to produce a steam-gas mixture having sufficient steam content to be utilized for generating mechanical energy, a counter current heat exchanger for condensing the steam contents of said mixture to a maximum and for evaporating and superheating a supply of separated steam condensate, means for separating the steam condensate from the gas emanating from said exchanger to form said separated steam condensate and means for supplying the separated steam condensate to said heat exchanger.

4. The apparatus of claim 3 further comprising a throttle valve for the separated steam condensate located between said separating means and said heat exchanger.

5. The apparatus of claim 4 further comprising a high pressure gas-steam power engine driven by the steam-gas mixture produced by said means for burning, means for supplying said steam-gas mixture from said high pressure engine to said exchanger, means for superheating the steam-gas mixture produced by said means for burning and supplied to said high pressure engine, a low pressure steam engine, and means for supplying super-heated steam derived from the separated steam condensate in said heat exchanger through said means for superheating to said low pressure engine.

6. The apparatus of claim 3 further comprising means for preheating the supply of separated steam condensate emanating from said separating means by the mixture emanating from said exchanger.

7. Apparatus for driving a pair of engines comprising means for decomposing $H_2O_2$ to liberate $O_2$, means for burning the liberated $O_2$ with a carbon-hydrogen and feed water to form a steam-gas mixture, a superheater, means for supplying said mixture to said superheater, a high pressure engine coupled to said superheater driven by said mixture, a counter heat exchanger coupled to said high pressure engine for condensing the steam contents of said mixture to a maximum and for evaporating a supply of separated steam condensate, means for separating the steam condensate from the gas emanating from said exchanger to form said separated steam condensate, means for supplying the separated steam condensate to said heat exchanger, means for supplying the evaporated feed water from said heat exchanger to said superheater for superheating thereof and a low pressure steam engine coupled to said superheater driven by the superheated feed water.

8. The apparatus of claim 7 further comprising a throttle valve for the separated steam condensate located between said separating means and said heat exchanger.

9. Apparatus for generating superheated steam comprising means for burning oxygen with a carbon-hydrogen and feed water to produce a steam-gas mixture having sufficient steam content to be utilized for generating mechanical energy, a counter heat exchanger for condensing the steam contents of said mixture to a maximum and for evaporating and superheating a supply of separated steam condensate, means for separating the steam condensate from the gas emanating from said exchanger to form said separated steam condensate and means for supplying the separated steam condensate to said heat exchanger.

References Cited in the file of this patent

UNITED STATES PATENTS

| | | |
|---|---|---|
| 1,263,390 | Edwin | Apr. 23, 1918 |
| 1,809,409 | Granger | June 9, 1931 |
| 2,286,207 | Keenan et al. | June 16, 1942 |
| 2,290,882 | Keenan | July 28, 1942 |
| 2,443,841 | Sweeney et al. | June 22, 1948 |
| 2,568,787 | Bosch | Sept. 25, 1951 |
| 2,663,146 | Legendre | Dec. 22, 1953 |

FOREIGN PATENTS

| | | |
|---|---|---|
| 679,007 | Great Britain | Sept. 10, 1952 |

OTHER REFERENCES

Text Book, "Internal Combustion Engines" by Gill, Smith and Ziurys, published by U.S. Naval Institute, Annapolis, Maryland, 1952 (pages 3-9 to 3-12, FIG. 3—3, pages 3-10).